United States Patent
Mitsufuji et al.

(10) Patent No.: US 6,936,673 B2
(45) Date of Patent: Aug. 30, 2005

(54) ANTI-BONDING METHODS FOR BLAST FURNACE SLAG OR ITS GRADING ADJUSTED SLAG

(75) Inventors: Hiroyuki Mitsufuji, Tokyo (JP); Chiaki Yoshizawa, Tokyo (JP); Takashi Wada, Tokyo (JP); Atsushi Yamaguchi, Tokyo (JP); Tomoo Takahashi, Gamagori (JP); Mitsuo Kinoshita, Gamagori (JP); Tatsushi Sugiyama, Gamagori (JP)

(73) Assignees: Takemoto Yushi Kabushiki Kaisha, Aichi (JP); Kokan Mining Co., Ltd., Tokyo (JP)

( * ) Notice: Subject to any disclaimer, the term of this patent is extended or adjusted under 35 U.S.C. 154(b) by 0 days.

(21) Appl. No.: 10/980,022

(22) Filed: Nov. 2, 2004

(65) Prior Publication Data

US 2005/0065306 A1 Mar. 24, 2005

Related U.S. Application Data

(62) Division of application No. 10/235,518, filed on Sep. 4, 2002, now abandoned.

(30) Foreign Application Priority Data

Sep. 7, 2001 (JP) .................................. 2001-271786
Jul. 29, 2002 (JP) .................................. 2002-219869

(51) Int. Cl.$^7$ .............................................. C08F 120/06
(52) U.S. Cl. ................. 526/287; 526/317.1; 526/303.1; 266/197
(58) Field of Search .............................. 526/317.1, 287, 526/303.1; 266/197

(56) References Cited

U.S. PATENT DOCUMENTS 2,833,745 A * 5/1958 Fikentscher .................. 526/75

* cited by examiner

Primary Examiner—William K. Cheung
(74) Attorney, Agent, or Firm—Beyer Weaver & Thomas LLP

(57) ABSTRACT

An anti-bonding agent for blast furnace slag or its grading adjusted slag which includes one or more polymers having a main constituent unit shown by

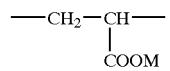

by a greater molar percentage than any other constituent unit where M is hydrogen atom, alkali metal such as sodium, alkali earth metal, ammonium or organic amine is used in an amount of 0.002–0.3 weight parts for 100 weight parts of such blast furnace slag or its grading adjusted slag, and may be applied as an aqueous solution with concentration of 1.5–10 weight %.

12 Claims, No Drawings

ANTI-BONDING METHODS FOR BLAST FURNACE SLAG OR ITS GRADING ADJUSTED SLAG

This is a divisional of application Ser. No. 10/235,518 filed Sep. 4, 2002, now abandoned which claims priority on Japanese patent applications 2001-271786 filed Sep. 7, 2001 and 2002-219869 filed Jul. 29, 2002, and is now abandoned.

BACKGROUND OF THE INVENTION

This invention relates to anti-bonding methods for blast furnace slag or its grading adjusted slag. From the point of view of the protection of natural resources now that the exhaustion of natural sand is becoming a serious problem in recent years, blast furnace slag and its grading adjusted slag obtained by crashing it and sorting it according to the particle size (hereinafter referred to together as the "blast furnace slag materials") are coming to be substituted more and more frequently for natural sand to be used in civil engineering projects and as fine aggregates for the production of concrete. Such blast furnace slag materials are frequently left piled up outdoors while waiting to be shipped or transported on a cargo boat over a long period of time. When they are thus left stored or transported over a long period of time, they tend to bond together, or to become consolidated, and may eventually become like blocks of rock. This phenomenon is particularly prominent in summer months when the temperature is high. Consolidated blast furnace slag materials cannot be used as a substitute for natural sand. An enormous labor would be required if it were attempted to forcibly use such consolidated blast furnace slag materials as a substitute of natural sand. Thus, it is a requirement to keep blast furnace slag materials from bonding or consolidating while they are being stored or transported over a long period of time if they are to be used as a substitute for natural sand. It is therefore an object of this invention to provide anti-bonding agents and methods for such blast furnace slag materials.

Examples of prior art anti-bonding agent for blast furnace slag materials include aliphatic hydroxycarboxylic acids and their salts (Japanese Patent Publication Tokkai 54-130496), lignin sulfonic acids and their salts (Japanese Patent Publication Tokkai 57-95857), saccharides (Japanese Patent Publication Tokkai 58-104050) and alkylene oxide adducts of aliphatic hydroxycarboxylic acids and their salts (Japanese Patent Publication Tokkai 2001-58855). These anti-bonding agents are usually used by preparing an aqueous solution diluted with water and applying it, say, by spraying it, on the blast furnace slag materials. Some of these prior art anti-bonding agents are more effective than the others but their anti-bonding effects are generally insufficient. Since the water retentivity of these blast furnace slag materials is generally low, it may be that the anti-bonding agent applied on them may flow away with the water used for diluting or rainwater such that the expected anti-bonding effect is not always obtained. Moreover, some prior art anti-bonding agents are said to adversely affect the strength of the hardened objects if the blast furnace slag material on which they are applied is used as fine aggregates in the production of concrete.

SUMMARY OF THE INVENTION

It is therefore an object of this invention to provide anti-bonding methods capable of sufficiently dependably prevent the bonding of blast furnace slag materials over an extended period of time without adversely affecting the physical properties of the materials such as blast furnace slag materials on which they are used.

In one aspect, the present invention relates to an anti-bonding agent for blast furnace slag materials characterized as comprising one or more polymers having a main constituent unit shown by Formula 1 given below:

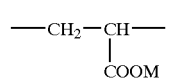

(Formula 1)

where M is hydrogen atom, alkali metal, alkali earth metal, ammonium or organic amine. In the above, the expression "main constituent unit" is to be understood as meaning the constituent unit which is contained by a largest molar percentage, or that no other constituent unit is contained by a larger molar percentage.

In another aspect, the invention relates to an anti-bonding method, or a method of preventing bonding of blast furnace slag materials characterized as using 0.002–0.3 weight parts of an anti-bonding agent of this invention per 100 weight parts of blast furnace slag materials.

Explained more in detail, an anti-bonding agent embodying this invention includes at least one polymer having a main constituent unit shown by Formula 1 given above and preferably contains such a constituent unit by 60 molar % or more. Examples of such polymer include polymers of acrylic acid, polymers of salts of acrylic acid, salts of polymers of acrylic acid, copolymers of acrylic acid, copolymers of salts of acrylic acid and salts of copolymers of acrylic acid.

If the polymer used as an anti-bonding agent of this invention contains constituent units other than the constituent units shown by Formula 1, such polymer is one obtained by copolymerization of a monomer which forms a constituent unit shown by Formula 1 and another monomer which forms another constituent unit. Examples of monomers which form such other constituent unit include methacrylic acid, salts of methacrylic acid, crotonic acid, salts of crotonic acid, maleic acid, maleic anhydrides, fumaric acid, alkyl acrylates, alkyl methacrylates, hydroxyalkyl acrylates, hydroxyalkyl methacrylates, acrylamides, allylsulfonic acid, salts of allylsulfonic acid, methallylsulfonic acid, salts of methallylsulfonic acid, styrenesulfonic acid, salts of styrenesulfonic acid, styrene, vinyl acetate, ethylene, isoprene and isoamylene.

Examples of M appearing in Formula 1 include (1) alkali metals such as sodium, potassium and lithium, (2) alkali earth metals such as calcium and magnesium, (3) ammonium and (4) organic amines such as triethanolamine and diethanolamine.

It is preferable that an anti-bonding agent of this invention should contain one or more selected from monomers having constituent units other than the constituent units shown by Formula 1. It is further preferable that such other polymers be contained by 5–30 molar %. Preferred examples of monomers forming such constituent units other than constituent units shown by Formula 1 include methacrylic acid, salts of methacrylic acid, alkyl acrylates, alkyl methacrylates, hydroxyalkyl acrylates, hydroxyalkyl methacrylates, acrylamides, allylsulfonic acid, salts of allylsulfonic acid, methallylsulfonic acid, salts of methallylsulfonic acid, styrenesulfonic acid and salts of styrenesulfonic acid because each of these serves to more effectively prevent the bonding of blast furnace slag materials for an extended period of time.

As explained above, M in Formula 1 represents hydrogen atom, an alkali metal, an alkali earth metal, ammonium or organic amine but polymers with M indicating sodium are preferred for the purpose of the present invention. As polymers, those with number-average molecular weight of 3000–100000 are preferred. Both are because they can more effectively prevent the bonding of blast furnace slag materials.

These polymers to be used for the anti-bonding agents according to this invention can be synthesized in a known conventional manner.

An anti-bonding method of this invention is characterized as using 0.002–0.3 weight parts of an anti-bonding agent of this invention per 100 weight parts of blast furnace slag materials. If less than 0.002 weight parts are used, the desired anti-bonding effect cannot be obtained. Even if more than 0.3 weight parts are used, on the other hand, the obtained anti-bonding effect is not accordingly larger and hence it is uneconomical. When an anti-bonding agent of this invention is used for blast furnace slag materials, the anti-bonding agent or an aqueous solution obtained by diluting it with water are usually mixed with the blast furnace slag materials by spraying.

According to an anti-bonding method of this invention, it is preferable to use 0.005–0.1 weight parts of an anti-bonding agent of this invention per 100 weight parts of blast furnace slag materials. It is also preferable to use an anti-bonding agent by diluting it with water to produce an aqueous solution of 1.5–10 weight %. Both are because the bonding of blast furnace slag materials can thus be more effectively prevented.

DETAILED DESCRIPTION OF EMBODIMENTS

The following eleven ((1)–(11)) examples may be mentioned as anti-bonding agents embodying this invention.

(1) Anti-bonding agent comprising polymer of sodium acrylate with number-average molecular weight of 3200.

(2) Anti-bonding agent comprising polymer of sodium acrylate with number-average molecular weight of 5800.

(3) Anti-bonding agent comprising polymer of sodium acrylate with number-average molecular weight of 7400.

(4) Anti-bonding agent comprising polymer of sodium acrylate with number-average molecular weight of 48000.

(5) Anti-bonding agent comprising sodium salts of polymer of acrylic acid with number-average molecular weight of 23000.

(6) Anti-bonding agent comprising copolymer of acrylic acid-methacrylic acid (having constituent unit comprising acrylic acid and constituent unit comprising methacrylic acid at molar ratio of 90/10) with number-average molecular weight of 3200.

(7) Anti-bonding agent comprising copolymer of sodium acrylate-sodium methacrylate (having constituent unit comprising sodium acrylate and constituent unit comprising sodium methacrylate at molar ratio of 75/25) with number-average molecular weight of 5100.

(8) Anti-bonding agent comprising copolymer of sodium acrylate-2-hydroxyethyl methacrylate (having constituent unit comprising sodium acrylate and constituent unit comprising 2-hydroxyethyl methacrylate at molar ratio of 80/20) with number-average molecular weight of 7300.

(9) Anti-bonding agent comprising copolymer of sodium acrylate-2-hydroxyethyl methacrylate-sodium styrenesulfonate (having constituent unit comprising sodium acrylate/constituent unit comprising 2-hydroxyethyl methacrylate/constituent unit comprising sodium styrenesulfonate at molar ratio of 75/15/10) with number-average molecular weight of 6600.

(10) Anti-bonding agent comprising copolymer of sodium acrylate-sodium styrenesulfonate (having constituent unit comprising sodium acrylate and constituent unit comprising sodium styrenesulfonate at molar ratio of 90/10) with number-average molecular weight of 17000.

(11) Anti-bonding agent comprising sodium salt of copolymer of acrylic acid-methacrylic acid (having constituent unit comprising acrylic acid and constituent unit comprising methacrylic acid at molar ratio of 75/25) with number-average molecular weight of 6700.

The following may be mentioned as an example of anti-bonding method embodying this invention.

(12) Anti-bonding method of preparing an aqueous solution of concentration 3–5 weight % by diluting any of the anti-bonding agents (1)–(11) described above with water and mixing it with blast furnace slag materials by spraying at a rate of 0.006–0.03 weight parts as anti-bonding agent per 100 weight parts of the blast furnace slag materials.

In what follows, the invention will be described by way of the results of test examples but it goes without saying that the invention is not limited to these examples. In the following, "parts" will mean "weight parts" and "%" will mean "weight %" unless specifically described to be otherwise.

Part 1: Preparation of Anti-bonding Agents

TEST EXAMPLE 1

Preparation of Anti-bonding Agent P-1

A 30% aqueous solution of sodium acrylate (an aqueous solution containing 94 g (1 mole) of sodium acrylate) 313 g, 3-mercaptopropionic acid 3 g and water 70 g were placed inside a reactor. After they were stirred and dissolved uniformly, the atmosphere was replaced with nitrogen. In this environment of nitrogen, the temperature of the reaction system was kept at 80° C. in a hot water bath and a polymerization process was started by dripping a 20% aqueous solution of sodium persulfate 8 g. The polymerization process was concluded after it was continued for 5 hours. A 25% aqueous solution of polymer of sodium acrylate with number-average molecular weight of 1100 was prepared. This will be referred to as the 25% aqueous solution of anti-bonding agent P-1.

TEST EXAMPLES 2–8

Preparation of Anti-Bonding Agents P-2–P-8

25% aqueous solutions of anti-bonding agents P-2–P-8 were prepared similarly as described above for the preparation of 25% aqueous solution of anti-bonding agent P-1.

TEST EXAMPLE 9

Preparation of Anti-bonding Agent P-9

A 25% aqueous solution of acrylic acid (an aqueous solution containing 72 g (1 mole) of acrylic acid) 288 g, 3-mercaptopropionic acid 2.5 g and water 54.3 g were placed inside a reactor. After they were stirred and dissolved uniformly, the atmosphere was replaced with nitrogen. In this environment of nitrogen, the temperature of the reaction system was kept at 80° C. in a hot water bath and a polymerization process was started by dripping a 20% aqueous solution of sodium persulfate 6 g. The polymerization process was concluded after it was continued for 6 hours to obtain a polymer of acrylic acid. Next, the reaction system was cooled to 20° C. and sodium hydroxide 40 g in a granular form was gradually added while the reaction system was maintained at 20–30° C. to prepare a 25% aqueous solution of sodium salt of polymer of acrylic acid with number-average molecular weight of 23000 (Test Example 9). This will be referred to as the 25% aqueous solution of anti-bonding agent P-9.

TEST EXAMPLE 10

Preparation of Anti-bonding Agent P-10

A 30% aqueous solution of sodium acrylate 313 g (94 g (1 mole) as sodium acrylate), styrene 10.4 g (0.1 mole), 3-mercaptopropionic acid 4.5 g and water 106 g were placed inside a reactor. After they were stirred and dissolved uniformly, the atmosphere was replaced with nitrogen. In this environment of nitrogen, the temperature of the reaction system was kept at 80° C. in a hot water bath and a polymerization process was started by dripping a 20% aqueous solution of sodium persulfate 5 g. The polymerization process was concluded after it was continued for 5 hours to obtain a 25% aqueous solution of sodium acrylate-styrene copolymer with number-average molecular weight of 1800 (Test Example 10). This will be referred to as the 25% aqueous solution of anti-bonding agent P-10.

TEST EXAMPLES 11–16

Preparation of Anti-bonding Agents P-11–P-16

25% aqueous solutions of anti-bonding agents P-11–P-16 of Test Examples 11-16 were prepared similarly as described above for the preparation of 25% aqueous solution of anti-bonding agent P-10 of Test Example 10.

TEST EXAMPLE 17

Preparation of Anti-bonding Agent P-17

A 25% aqueous solution of acrylic acid 216 g (54 g (0.75 moles) as acrylic acid), a 25% aqueous solution of methacrylic acid 86 g (21.5 g (0.25 moles) as methacrylic acid), 3-mercaptopropionic acid 4 g and water 58.8 g were placed inside a reactor. After they were stirred and dissolved uniformly, the atmosphere was replaced with nitrogen. In this environment of nitrogen, the temperature of the reaction system was kept at 80° C. in a hot water bath and a polymerization process was started by dripping a 20% aqueous solution of sodium persulfate 6 g. The polymerization process was concluded after it was continued for 5 hours to obtain a copolymer of acrylic acid and methacrylic acid.

Next, the reaction system was cooled to 20° C. and sodium hydroxide 40 g in a granular form was gradually added while the reaction system was maintained at 20–30° C. to prepare a 25% aqueous solution of sodium salt of copolymer of acrylic acid and methacrylic acid with number-average molecular weight of 6700 (Test Example 17). This will be referred to as the 25% aqueous solution of anti-bonding agent P-17.

TEST EXAMPLES 18–20

25% aqueous solutions of the same anti-bonding agent P-13 as in Test Example 13 were prepared. These Test Examples are summarized in Table 1 below.

Part 2 Evaluations (Part 1) of the Anti-bonding Agents

Blast furnace slag (grading adjusted slag with a particle diameter distribution of 5 mm blast furnace slag fine aggregates produced by Kokan Mining Co., Ltd. of Fukuyama, Japan, according to JIS-A5011 (slag aggregates for concrete)) 50 kg was spread in a vat while the 25% aqueous solutions of the anti-bonding agents prepared in Part 1 were further diluted with water to prepare aqueous solutions with concentrations shown in Table 1. Each of the aqueous solutions thus prepared as an anti-bonding agent was sprayed on and mixed with the slag spread in the vat at the mixing rate also shown in Table 1 by using a hand scoop. Water was added such that the water content of the blast furnace slag would become 10% and mixed together for 5 minutes by means of a mixer to obtain a slag-agent mixture. A cylindrical container with inner diameter of 100 mm was filled with this mixture to a height of 125 mm, and a sample was obtained by applying a pressure of 1.5 kg/cm$^2$ thereon as an equivalent of pressure on a blast furnace slag stored at a height of 10 m. The cylindrical sample container was thereafter sealed in order to prevent the evaporation of the water component and cured for a maximum period of 10 weeks inside a thermostatic chamber maintained at 80° C. After a specified curing period, the sample was removed and the particle size was measured by using a 5 mm screen and measuring the amount of the portion remaining on the screen without being able to pass therethrough ("Portion Remaining on 5 mm Screen" in Table 1). The smaller the numerical value of this portion, the more effectively is the bonding of the blast furnace slag prevented.

TABLE 1

| | | Anti-bonding agent | | | | Portion Remaining on 5 mm Screen (%) | | | | | |
| | | | Average-number | | | Curing period (week) | | | | | |
| | | Constituent unit of copolymer | molecular | Added | Concentration | | | | | | |
| | Kind | (molar %) *1 | weight | quantity | (%) | 1 | 2 | 4 | 6 | 8 | 10 |
| Test | | | | | | | | | | | |
| 1 | P-1 | SA | $1.1 \times 10^3$ | 0.03 | 6 | 0 | 0 | 0 | 0 | 21 | 100 |
| 2 | P-2 | SA | $1.5 \times 10^3$ | 0.03 | 6 | 0 | 0 | 0 | 0 | 15 | 100 |
| 3 | P-3 | AAd | $1.9 \times 10^3$ | 0.03 | 5 | 0 | 0 | 0 | 0 | 25 | 100 |
| 4 | P-4 | SA | $3.2 \times 10^3$ | 0.03 | 5 | 0 | 0 | 0 | 0 | 0 | 5 |
| 5 | P-5 | SA | $5.8 \times 10^3$ | 0.03 | 3 | 0 | 0 | 0 | 0 | 0 | 8 |
| 6 | P-6 | SA | $7.4 \times 10^3$ | 0.03 | 3 | 0 | 0 | 0 | 0 | 0 | 4 |
| 7 | P-7 | SA | $4.8 \times 10^4$ | 0.03 | 4 | 0 | 0 | 0 | 0 | 0 | 6 |
| 8 | P-8 | SA | $2.3 \times 10^5$ | 0.03 | 4 | 0 | 0 | 0 | 0 | 14 | 100 |
| 9 | P-9 | SA | $2.3 \times 10^4$ | 0.03 | 4 | 0 | 0 | 0 | 0 | 0 | 5 |
| 10 | P-10 | SA(85)/ST(15) | $1.8 \times 10^3$ | 0.03 | 6 | 0 | 0 | 0 | 0 | 23 | 100 |
| 11 | P-11 | SA(75)/MA(15)/AAm(10) | $3.5 \times 10^5$ | 0.03 | 3 | 0 | 0 | 0 | 0 | 7 | 100 |
| 12 | P-12 | AAd(90)/MAd(10) | $3.2 \times 10^3$ | 0.03 | 4 | 0 | 0 | 0 | 0 | 0 | 0 |

TABLE 1-continued

| | | Anti-bonding agent | | | | Portion Remaining on 5 mm Screen (%) Curing period (week) | | | | | |
|---|---|---|---|---|---|---|---|---|---|---|---|
| | Kind | Constituent unit of copolymer (molar %) *1 | Average-number molecular weight | Added quantity | Concentration (%) | 1 | 2 | 4 | 6 | 8 | 10 |
| 13 | P-13 | SA(75)/SM(25) | $5.1 \times 10^3$ | 0.03 | 4 | 0 | 0 | 0 | 0 | 0 | 0 |
| 14 | P-14 | SA(80)/HM(20) | $7.3 \times 10^3$ | 0.03 | 5 | 0 | 0 | 0 | 0 | 0 | 0 |
| 15 | P-15 | SA(75)/HM(15)/SSS(10) | $6.6 \times 10^3$ | 0.03 | 5 | 0 | 0 | 0 | 0 | 0 | 0 |
| 16 | P-16 | SA(90)/SSS(10) | $1.7 \times 10^4$ | 0.03 | 3 | 0 | 0 | 0 | 0 | 0 | 0 |
| 17 | P-17 | SA(75)/SM(25) | $6.7 \times 10^3$ | 0.03 | 5 | 0 | 0 | 0 | 0 | 0 | 0 |
| 18 | P-13 | SA(75)/SM(25) | $5.1 \times 10^3$ | 0.02 | 3 | 0 | 0 | 0 | 0 | 0 | 0 |
| 19 | P-13 | SA(75)/SM(25) | $5.1 \times 10^3$ | 0.01 | 4 | 0 | 0 | 0 | 0 | 0 | 0 |
| 20 | P-13 | SA(75)/SM(25) | $5.1 \times 10^3$ | 0.006 | 6 | 0 | 0 | 0 | 0 | 0 | 0 |
| Comp | | | | | | | | | | | |
| 1 | None | | | | | 100 | — | — | — | — | — |
| 2 | GS | | | 0.03 | 5 | 0 | 0 | 27 | 54 | 100 | — |
| 3 | GS-4 | | | 0.03 | 5 | 0 | 0 | 0 | 4 | 95 | 100 |

In Table 1 and thereafter:
Test: Test Examples
Comp: Comparison Examples
*1 Described by way of monomers corresponding to the constituent units for polymer
Added Quantity: Weight part of anti-bonding agent added to 100 weight parts of blast furnace slag
SA: Sodium acrylate
AAd: Acrylic acid
ST: Styrene
MA: Methyl acrylate
AAm: Acrylamide
MAd: Methacrylic acid
SM: Sodium methacrylate
HM: 2-hydroxyethyl methacrylate
SSS: Sodium styrenesulfonate
GS: Sodium gluconate
GS-4: 4-mole ethylene oxide adduct of sodium gluconate Part 3 Evaluations (Part 2) of the Anti-bonding Agents The 25% aqueous solutions of anti-bonding agents prepared in Part 1 and others were further diluted with water to prepare aqueous solutions with concentrations shown in Table 2. Blast furnace slag was crushed by a crusher and sprayed with these aqueous solutions with concentrations (as anti-bonding agents) adjusted as shown in Table 2 by amounts shown in Table 2. The sprayed slag was thereafter sorted by a screen to obtain 80 tons of blast furnace slag with grading adjusted to that of 5 mm fine aggregate. The blast furnace slag thus obtained with an anti-bonding agent was left outdoors in a pile of height 3 m for 14 weeks, and its penetration resistance modulus was measured as follows at times shown in Table 2 during this period of 14 weeks to evaluate the anti-bonding characteristics. If the penetration resistance modulus is less than 0.45, it is considered "no problem" due to bonding. The results of these tests are also shown in Table 2.

The penetration resistance modulus was measured by causing a probe for measuring penetration of resistance according to the Guideline for Blast Furnace Slag Aggregate Concrete (Concrete Library, Vol. 76, page 21 (Japan Society of Civil Engineers, 1993)) to penetrate the pile and using the following formula:

Modulus=(Load on spring scale (in kgf) at penetration of 100 cm)/(distance of penetration 100 cm), or Modulus=(Maximum load (20 kgf) on spring scale)/(distance of penetration (cm) when maximum load on spring scale is 20 kgf).

TABLE 2

| | Anti-bonding agent | | | Penetration resistance modulus (kgf/cm) | | | | | | | | |
|---|---|---|---|---|---|---|---|---|---|---|---|---|
| | | Added | Concentration | Period (week) | | | | | | | | |
| | Kind | amount | (%) | 0 | 1 | 2 | 4 | 6 | 8 | 10 | 12 | 14 |
| Test | | | | | | | | | | | | |
| 21 | P-2 | 0.03 | 6 | 0.07 | 0.10 | 0.11 | 0.11 | 0.13 | 0.15 | 0.18 | 0.47 | 0.57 |
| 22 | P-4 | 0.03 | 6 | 0.07 | 0.08 | 0.09 | 0.10 | 0.11 | 0.14 | 0.15 | 0.19 | 0.46 |
| 23 | P-6 | 0.03 | 4 | 0.07 | 0.09 | 0.10 | 0.10 | 0.12 | 0.13 | 0.15 | 0.20 | 0.47 |
| 24 | P-7 | 0.03 | 4 | 0.07 | 0.10 | 0.11 | 0.12 | 0.11 | 0.13 | 0.14 | 0.18 | 0.48 |

TABLE 2-continued

| | Anti-bonding agent | | Penetration resistance modulus (kgf/cm) | | | | | | | | |
|---|---|---|---|---|---|---|---|---|---|---|---|
| | | Added | Concentration | | | | Period (week) | | | | |
| | Kind | amount | (%) | 0 | 1 | 2 | 4 | 6 | 8 | 10 | 12 | 14 |
| 25 | P-8 | 0.03 | 3 | 0.07 | 0.09 | 0.09 | 0.10 | 0.12 | 0.17 | 0.20 | 0.46 | 0.56 |
| 26 | P-9 | 0.03 | 4 | 0.07 | 0.10 | 0.11 | 0.11 | 0.11 | 0.12 | 0.13 | 0.17 | 0.47 |
| 27 | P-10 | 0.03 | 5 | 0.07 | 0.09 | 0.10 | 0.11 | 0.13 | 0.13 | 0.15 | 0.47 | 0.58 |
| 28 | P-11 | 0.03 | 3 | 0.07 | 0.08 | 0.10 | 0.11 | 0.12 | 0.14 | 0.16 | 0.47 | 0.58 |
| 29 | P-13 | 0.03 | 5 | 0.07 | 0.07 | 0.08 | 0.09 | 0.10 | 0.09 | 0.11 | 0.13 | 0.15 |
| 30 | P-14 | 0.03 | 5 | 0.07 | 0.07 | 0.09 | 0.08 | 0.10 | 0.12 | 0.12 | 0.14 | 0.16 |
| 31 | P-15 | 0.03 | 5 | 0.07 | 0.08 | 0.08 | 0.10 | 0.09 | 0.11 | 0.13 | 0.15 | 0.18 |
| 32 | P-16 | 0.03 | 3 | 0.07 | 0.07 | 0.08 | 0.11 | 0.10 | 0.12 | 0.13 | 0.15 | 0.20 |
| 33 | P-17 | 0.03 | 5 | 0.07 | 0.07 | 0.07 | 0.08 | 0.09 | 0.09 | 0.10 | 0.11 | 0.15 |
| Comp | | | | | | | | | | | | |
| 4 | None | | | 0.07 | 0.10 | 0.25 | 0.50 | 0.65 | 0.85 | — | — | — |
| 5 | GS | 0.03 | 5 | 0.07 | 0.11 | 0.11 | 0.35 | 0.47 | 0.58 | 0.77 | — | — |
| 6 | GS-4 | 0.03 | 5 | 0.07 | 0.09 | 0.11 | 0.13 | 0.18 | 0.46 | 0.61 | 0.65 | 0.78 |
| CP(mm) | | | | 0 | 0 | 0 | 23 | 23 | 139 | 139 | 330 | 350 |

In Table 2:
CP: Cumulative precipitation

Part 4 Evaluations (Part 3) of the Anti-bonding Agents

Concrete samples were prepared as follows under the conditions described in Table 3. Normal portland cement (specific weight=3.16; braine value=3300), fine aggregates (Ooi-gawa River sand with specific weight=2.63), blast furnace slag (produced by Kokan Mining Co., Ltd. Fukuyama with specific weight=2.74) with the aqueous solution of an anti-bonding agent sprayed on and mixed together as done in Part 2 and coarse aggregates (crushed stones from Okazaki with specific weight=2.68) were sequentially added into a forced-mixing pan-type mixer with capacity 50 liters and subjected to a free kneading process for 15 seconds. Next, an AE water reducing agent (CHUPOL EX20 produced by Takemoto Yushi Kabushiki Kaisha) was mixed with each of the samples at a rate of 0.2 weight % of the weight of the cement such that the target slump would be within the range of 18±1 cm, and the mixture was kneaded with water for two minutes. An air entraining (AE) agent (AE200 produced by Takemoto Yushi Kabushiki Kaisha) was also added such that the target air content would be 4–5%. Slump, air content and compressive strength of each concrete sample thus obtained were measured according to JIS-A1101, JIS-A1128 and JIS-A1108, respectively. The results of these measurements are shown in Table 4.

TABLE 3

| Water/Cement ratio (%) | | | 50 |
|---|---|---|---|
| Percentage of fine aggregates (%) | | | 49 |
| Target air content (cm) | | | 4.5 |
| Target slump (cm) | | | 18 |
| Unit quantity (kg/m³) | Cement | | 366 |
| | Water | | 183 |
| | Fine aggregates | River sand | 245 |
| | | Blast furnace slag with anti-bonding agent added | 597 |
| | Coarse aggregates | | 925 |

TABLE 4

| | | | | Compressive strength (N/mm²) | |
|---|---|---|---|---|---|
| Test Examples | Kind of anti-bonding agent | Slump | Air content | Age of material = 7 days | Age of material = 28 days |
| 1 | P-1 | 18.5 | 4.4 | 30.2 | 43.3 |
| 2 | P-2 | 18.5 | 4.4 | 30.3 | 43.4 |
| 3 | P-3 | 18.6 | 4.5 | 30.5 | 43.3 |
| 4 | P-4 | 18.5 | 4.4 | 30.7 | 43.9 |
| 5 | P-5 | 18.6 | 4.5 | 30.4 | 43.9 |
| 6 | P-6 | 18.5 | 4.4 | 31.1 | 44.0 |
| 7 | P-7 | 18.7 | 4.5 | 30.8 | 43.9 |
| 8 | P-8 | 18.6 | 4.6 | 30.4 | 43.3 |
| 9 | P-9 | 18.7 | 4.5 | 30.7 | 43.8 |
| 10 | P-10 | 18.5 | 4.5 | 30.3 | 43.8 |
| 11 | P-11 | 18.8 | 4.4 | 31.1 | 43.9 |
| 12 | P-12 | 18.4 | 4.4 | 31.2 | 44.3 |
| 13 | P-13 | 18.5 | 4.5 | 31.2 | 44.2 |
| 14 | P-14 | 18.4 | 4.5 | 31.3 | 44.3 |
| 15 | P-15 | 18.6 | 4.4 | 31.2 | 44.1 |
| 16 | P-16 | 18.7 | 4.3 | 31.3 | 44.2 |
| 17 | P-17 | 18.5 | 4.5 | 31.1 | 44.2 |
| 18 | None | 18.2 | 4.6 | 29.3 | 42.3 |
| 19 | GS | 18.3 | 4.5 | 29.3 | 41.9 |
| 20 | GS-4 | 18.4 | 4.4 | 30.2 | 43.2 |

As should be clear from the above, the present invention has the effect of effectively preventing the bonding of blast furnace slag materials for an extended period of time without adversely affecting the target objects for which such blast furnace slag materials may be used.

What is claimed is:

1. An anti-bonding method for blast furnace slag or its grading adjusted slag, said anti-bonding method comprising the steps of:

preparing an aqueous solution of an anti-bonding agent comprising one or more acrylic acid polymers having a main constituent unit shown by Formula 1 given below by a greater molar percentage than any other constituent unit:

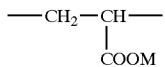

(Formula 1)

where M is hydrogen atom, alkali metal, alkali earth metal, ammonium or organic amine; and applying 0.002–0.3 weight parts of said aqueous solution as said anti-bonding agent to 100 weight parts of said blast furnace slag or its grading adjusted slag, wherein consolidation of said blast furnace slag or its grading adjusted slag is prevented.

2. The anti-bonding method of claim 1 wherein said anti-bonding agent is used in an amount of 0.005–0.1 weight parts for 100 weight parts of said blast furnace slag or grading adjusted slag thereof.

3. The anti-bonding method of claim 2 wherein said anti-bonding agent is used as a 1.5–10 weight % aqueous solution.

4. The anti-bonding method of claim 3, said one or more polymers having said main constituent unit shown by Formula 1 by 60 molar % or greater.

5. The anti-bonding method of claim 4, said one or more polymers also having other constituent units different from said main constituent unit shown by Formula 1.

6. The anti-bonding method of claim 5, said one or more polymers having said other constituent units by 5–30 molar %.

7. The anti-bonding method of claim 6 wherein said other constituent units are formed from one or more monomers selected from the group consisting of methacrylic acid, salts of methacrylic acid, alkyl acrylates, alkyl methacrylates, hydroxyalkyl acrylates, hydroxyalkyl methacrylates, acrylamides, allylsulfonic acid, salts of allylsulfonic acid, methallylsulfonic acid, salts of methallylsulfonic acid, styrenesulfonic acid and salts of styrenesulfonic acid.

8. The anti-bonding method of claim 4 wherein M is sodium.

9. The anti-bonding method of claim 7 wherein M is sodium.

10. The anti-bonding method of claim 4 wherein the number-average molecular weight of said one or more polymers is 3000–100000.

11. The anti-bonding method of claim 7 wherein the number-average molecular weight of said one or more polymers is 3000–100000.

12. The anti-bonding method of claim 9 wherein the number-average molecular weight of said one or more polymers is 3000–100000.

* * * * *